United States Patent [19]

Queuille

[11] 3,903,270

[45] Sept. 2, 1975

[54] NOVEL TREATMENT OF PEPSIC HYPERACTIVITY

[75] Inventor: Andre Queuille, Noisy-le-Sec, France

[73] Assignee: Roussel-UCLAF, Paris, France

[22] Filed: Mar. 28, 1973

[21] Appl. No.: 345,672

[30] Foreign Application Priority Data

Mar. 29, 1972 France .............................. 72.11015

[52] U.S. Cl. ................................................ 424/195
[51] Int. Cl. ............................................. A61k 27/00
[58] Field of Search ............................. 424/195, 180

[56] References Cited
UNITED STATES PATENTS

| | | | |
|---|---|---|---|
| 3,364,111 | 1/1968 | Morii et al. ........................... | 424/180 |
| 3,432,489 | 3/1969 | Nitta et al. ........................... | 424/180 |
| 3,487,150 | 12/1969 | Barnes et al. ........................ | 424/180 |
| 3,686,164 | 8/1972 | Unger et al. ......................... | 424/180 |

OTHER PUBLICATIONS

Chemical Abstracts, Vol. 53, 13450h, Vol. 54, 14585a, Vol. 54, items 13250i, 14135h, 19097g and Vol. 55, 16698i.

Schachat et al., Chem. Eng. News, Sept. 22, 1958, (p. 32).

*Primary Examiner*—Frederick E. Waddell
*Attorney, Agent, or Firm*—Hammond & Littell

[57] ABSTRACT

Novel pharmaceutical compositions having as the active ingredient at least one alkali metal salt of the sulfuric acid ester of a high molecular weight polysaccharide extracted from *Furcellaria fastigiata* algae (*Rhodophyces - gigantinals*) and a method of treating pepsic hyperactivity in warm-blooded animals by oral administration of said alkali metal salts.

1 Claim, No Drawings

1

NOVEL TREATMENT OF PEPSIC HYPERACTIVITY

STATE OF THE ART

Schachat et al [Chem. Eng. News, Sept. 22, 1958, p. 32] reported the potassium salt of the sulfuric acid ester of a high molecular weight polysaccharide under the name Furcellaran and mixed salts of potassium, ammonium or sodium salts thereof are reported under the name of salts of Furcelleran in Federal Register, Vol. 26 (1961), p. 9412. Moreover, the Tragacanth Importing company sells a mixed sodium-potassium salt of sulfuric acid ester of a high molecular weight polysaccharide extracted from Furcellaria fastigiata algae under the mark TIC Colloid 600.

OBJECTS OF THE INVENTION

It is an object of the invention to provide novel compositions having a pepsin antagonistic activity.

It is a further object of the invention to provide a novel method of treating pepsic hypersecretion in warm-blooded animals.

These and other objects and advantages of the invention will become obvious from the following detailed description.

THE INVENTION

The novel pharmaceutical compositions of the invention are comprised of an effective amount of at least one alkali metal salt of the sulfuric acid ester of a high molecular weight polysaccharide extracted from *Furcellaria fastigiata algae* (*Rhodophyces - gigantinals*) and an oral pharmaceutical carrier. The compositions may be in the forms of gels, emulsions, suspensions, granules, powders and delayed aromatic powders in water. The compositions may contain other active principles such as protective agents of the gastric lining like an alkaline buffer, a bismuth salt, a basic aluminum salt; antispasmodic agents like atropine salts; a local anesthetic; a protective gel for gastric linings like acrylamide polymers or methacrylamide polymers.

The alkali metal salts of the sulfuric acid ester of a high molecular weight polysaccharide occur in the form of a colorless or weakly colored powder with no odor or taste and contain 8 to 13% of water and form gels after dissolution in water. For example, a 1% aqueous solution of the mixed sodium -potassium salt (TIC Colloid 600) has a specific viscosity of 3,200 to 4,700 centipoises.

The said salts are obtained by extraction with water of a red algae, *Furcellaria fastigiata*, coming from the cold seas, and evaporating the aqueous extract to dryness. These salts of the sulfated polysaccharide are clearly differenciated from sulfated polysaccharides extracted from other algae such as agar-agar or Iceland moss by its chemical and physical properties. Their solutions precipitate by addition of divalent metal salts, potassium salts or alkaloid solutions. They are stable at a pH of about 5.5 to 8.5 and are rapidly hydrolyzed in an acid media.

The alkali metal salts of the sulfuric acid ester of a high molecular weight polysaccharide defined as already, form extremely viscous gels, relatively stable upon heating and at an extended pH range, the gells formed possess thixotropic properties. The viscosity and fluidity of the gels can be modified by addition of glycerol, sorbitol or other polyalcohols. The gels formed become liquids at a temperature above 40°C.

The therapeutic compositions of the invention have an antagonistic action to pepsin and are therefore useful for protection of gastric linings such as for treatment of pepsic hyperactivity. The compositions are used for the treatment of gastric or duodenal ulcers due to a pepsic hypersecretion, for the treatment of pyrosis and of ulcerations due to use of steroidal or non-steroidal anti-inflammatory medications.

The novel method of the invention for the treatment of pepsic hyperactivity in warm-blooded animals comprises orally administering to warm-blooded animals an amount of at least one alkali metal salt of the sulfuric acid ester of a high molecular weight polysaccharide extracted from Furcellaria fastigiata algae (*Rhodophyces - gigantinals*) sufficient to combat excess pepsin. The usual useful dose is 4 to 200 mg/kg.

In the following examples there are described several preferred embodiments to illustrate the invention. However, it should be understood that the invention is not intended to be limited to the specific embodiments.

The salt used in the example was the mixed sodium-potassium salt sold under the tradename TIC Colloid 600 which occurs as a colorless to beige powder. A 1% aqueous dispersion of the said mixed salt is a viscous colloid dispersion after about 30 minutes and the pH of the 1% dispersion is 7 to 9. Loss after drying was nearly 8% at 100°C in an oven. Analysis: Sulfur — about 5% (dried product); Potassium — about 14%; Sodium — about 1%; Sulfuric ash — about 36%.

EXAMPLE 1

Sachets containing 2 g of TIC Colloid 600: one admixes 2 g of TIC Colloid 600, 0.2g of calcium silicate, 1 g of corn starch, 0.03 g of ethylcellulose, 0.05 g of polyvinylpyrrolidone, 0.12 g of strawberry Polvaromas and 4.60 g of sugar ice.

EXAMPLE 3

Sachets containing 1 g of TIC Colloid 600: one admixes 1 g of TIC Colloid 600, 0.2 g of calcium silicate, 1 g of corn starch, 0.03 g of ethylcellulose, 0.05 g of polyvinylpyrrolidone, 0.12 g of lemon Polvaromas and 5.60 g of sugar ice.

EXAMPLE 3

Sachets containing 1 g of TIC Colloid 600: one admixes 1 g of TIC Colloid 600, 2 g of Purifloc N 17 (polyacrylamide), 0.2 g of calcium silicate, 1 g of corn starch, 0.03 g of ethylcellulose, 0.05 g of polyvinylpyrrolidone, 0.12 g of strawberry Polvaromas and 3.60 g of sugar ice.

EXAMPLE 4

Sachets containing 0.50 g of TIC Colloid 600 : one admixes 0.50 g of TIC Colloid 600, 2 g of Purifloc N 17 (polyacrylamide), 0.2 g of calcium silicate, 1 g of corn starch, 0.03 g of ethylcellulose, 0.50 g of polyvinylpyrrolidone. 0.12 g of lemon Polvaromas and 4.10 g of sugar ice.

EXAMPLE 5

Granules were prepared by admixing 20 g of TIC Colloid 600, 0.06 g of sodium saccharinate, 0.70 g of solid and liquid perfumes and sufficient semolina sugar to obtain 100 g of final mixture.

EXAMPLE 6

Complex granules were prepared by admixing 20 g of TIC Colloid 600, 20 g of Purifloc N 17, 20 g of bismuth subnitrate, 0.06 g of sodium saccharinate, 0.70 g of solid and liquid perfumes and sufficient semolina sugar to obtain 100 g of final mixture.

EXAMPLE 7

Gels were prepared by admixing 1 g of TIC Colloid 600, 0.12 g of methyl p-hydroxybenzoate, 0.03 g of propyl p-hydroxybenzoate, 0.10 g of sodium metabisulfite, perfume and sufficient water to obtain 100 ml of solution.

CLINICAL STUDY

The clinical study was effected with TIC Colloid 600 in the form of sachets containing 1 g of the active salts. A. A 40 year old male patient hospitalized with atypic postprandial epigastric aches appeared many months previously and accompanied by an important emaciation. The patient had undergone a gastractomy of the Finsterer type 10 years before for a duodenal ulcer. Radiography of the stomach was normal and endoscopy showed signs of gastritis and especially supraanastomotic ulcer and on the other hand, gastro-jejunal anastomosis and the sub-jacent small intestine were normal. The gastric lining showed any acid secretion. The patient received 3 sachets containing 1 g of active ingredient per day associated with an injection of a speciality based on a sodium ferric-ferrous complex of 2,3-diketo-1-gulonic acid. After 12 days of treatment, the pain was clearly less sharp, much less prolonged and did not last more than a day and there were no side effects.

Conclusion

The results were good for the product associated with an injectable product against epigastralgia in relation with supra-anastomotic ulcer and excellent tolerance. B. A 42 year old female patient's appeared for consultation for post-prandial epigastric burns rapidly released by wine and spicy dishes. Moreover, there is a postural pyrosis which was especially present at night. Radiography of the stomach did not show any ulcer but on the other hand, did show a hiatale hernia with gastro-esophagus reflux. Treatment consisted of administration of the product at a dose of a sachet of 1 gm of active principle before the two principal meals for 14 days and at the end of the treatment, symptomatic effect was good because the post-prandial epigastric pains had almost completely disappeared and the nocturnal pyrosis was less intense and less prolonged without any side effects.

Conclusion

Good results of the product with a gastritic type symptomatology accompaning a hiatal hernia with reflux and excellent tolerance. C. A 31 year old man was hospitalized in an emergency for violent abdominal pain symdrome, calling forth a surgical emergency because there existed an arrest of material and of gas and a epigastric defense. The signs partially receded but atypical epigastric pains persisted the days following admission. Two years before, the patient had been operated on and they had discovered a mass at the root of the mesentery of an unknown nature. Two months before admission, the ulcer diagnosis was given, and radiography of the stomach actually was normal and did not show an ulcer in evolution. The patient was treated at the rate of 3 sachets of 1 g of active principle per day associated with Isoniazide and Ethanobutol previously received for pulmonary tuberculosis. The epigastric pains progressively diminished in intensity until they disappeared after about 10 days of treatment without any side effects.

Conclusion

The average effect of the product against epigastralgic pain with a badly defined etiology in a patient having a duodenal ulcer two months before with good tolerance. D. A 45 year old male patient was hospitalized with a digestive hemorrage (hematemesis and malena) probably aggravated by a dose of aspirin. There did not exist any previous pain and radiography of the stomach top in emergency shows an ulcerous deformation of the bulb, indirect signs and a very probable but uncertain niche. The patient was placed in an anti-ulcerous treatment, associating the product of the invention at a rate of 3 sachets per day of 1 gm of active principle per sachet, a speciality based on a sodium ferric ferrous complex of 2,3-diketo-acid at a rate of 2 injections per day and atropine at a rate of 1 mg per day. Due to the absence of pain, the results were judged in about a month with a controlled radiography and this showed the persistance of the bulb deformation but did not find again the niche. Tolerance was excellent.

Conclusion

Good results of the product used as gastric dressing in a complete anti-ulcerous treatment (duodenal ulcer revealed by a hemorrage) without any observed secondary effects. E. A 41 year old male patient was operated on some years before for a gastro-enterostoma probably for a duodenal ulcer. The patient was hospitalized in emergency for a hematemesis and a melaena which appeared in the course of treatment with phenylbutazone prescribed for rachidienal pain. Endoscopy performed in emergency showed small clots set in the lining and a ecchymotic aspect of the posterior upper surface of the stomach. Radiography of the stomach showed a good gastroenterostoma function and a normal bulb. It concerns then a digestive accident due to Phenylbutazone. The patient was treated with the product at a rate of 3 sachets a day of 1 g of active principle per sachet although there did not exist any digestive symptomatology. After 8 days an endoscopic control showed a normal stomach without any secondary side effects.

Conclusion

Prescription of the product in the course of an accidental digestive hemorrage due to Phenylbutazone caused the disappearance of gastric leisons on the 8th day and no side effects were observed. F. A male patient 25 years old was hospitalized for exploration for atypic epigastralgia developed over several weeks. A certain post-prandial rythm exists in fact, but the time table was not fixed and noctural pains were late. On admission, the patient was treated with the product at a rate of 2 sachets per day having 1 g of active principle. On the 8th day of treatment, radiography of the stomach showed an evident duodenal ulcer. One could then judge the effect of the product alone on a duodenal ulcer in formation: Symptomatic action was average. In effect, the pain was less keen and was of less prolonged persistence however after the 8 days of treatment without side effects.

Conclusion

Average effect of the product alone against a evolving duodenal ulcer and there were no side effects ascertained. G. A 61 year old patient had undergone in 1970 a Pean type gastractomy for an ulcer of the large vertical bend, causing 2 hematemesis in a 4 year interval. One the other hand, it concerns a cirrhotic subject that was confirmed by hepatic biopsy made in the course of intervention. He was hospitalized by the service for epigastric burns recently appearing without rythm or periodicity. Radiography of the stomach was normal and a first endoscopy showed an intense gastritis of the stump, an appearance of stomitis and anastomotic ulcer. In effect, the reality of this last anomaly is placed in doubt because the gastric secretion is null. A second endoscopy a few days later did not find again any ulcer. It concerns an intense gastritis after gastractomy. The product was prescribed at a rate of 3 sachets per day having 1 g of the active principle for 12 days and the results of the treatment were good because in a few days the burns diminished in intensity and frequency. At the end of the treatment, it had completely disappeared and there were no side effects.

Conclusion

Good results with the product against epigastric burning in relation with a gastritis of the stump. No side effects were ascertained. H. An 80 year old male patient was hospitalized for aftereffects of a fall and especially for a social problem. He reports a dyspeptic symptomatology with some burning. Radiography of the stomach was normal. The patient received a gel based on aluminum phosphate for 10 days with fairly good results but stopping of the treatment caused the return of epigastric symptomatology. The patient then received the product in the form of a sachet of 1 g of active principle after the 2 principal meals for a month. The results were better thant those obtained with the gel of aluminum phosphate and the dispeptic troubles disappeared during the treatment without any secondary effects.

Conclusion

Excellent results of the product with *banal dyspepsia* of an old man and no side effects were ascertained. I. A 50 year old male patient was hospitalized by the surgical staff for a perforated ulcer that was sutured. The perforation had been preceded by *epigastralgea* of the ulcerous type in the three previous weeks. It was decided by the staff to subject the patient to an antiulcerous treatment in spite of the actual absence of symptomatology. The patient received each day 2 tablets of a speciality based on 100 mg of methylsulfate of diphemanyl, 3 sachets of the product containing 1 g of active principle and an intramuscular injection of a speciality containing a sodium ferroferric complex of 2,3-diketo-1-gulonic acid for 20 days. The results were not jugded on a clinical plan but at the end of the treatment, test radiography showed the absence of a bulbar niche and a banal deformation in relation with the suture. Tolerance was excellent.

Conclusion

Good results with the product used with gastric dressing in antiulcerous treatment and no side effects were ascertained. J. A 43 year old male patient was hospitalized by the staff for a severe evolutive growth of a duodenal ulcer whose first manifestations arose 18 months previously. Radiography of the stomach showed a centro-bulbar niche and gastric secretion was hypohydrochloric. The existence of nocturnal posterior pains evoked a stopped up perforated ulcer. The patient was placed on a complete antiulcerous treatment comprising 3 sachets per day of the product at 1 g of active principle, a speciality based on a sodium ferroferric complex of 2,3-diketo-1gulonic acid at a rate of one intramuscular injection per day and 0.5 mg of atropine sulfate per day. The epigastric pain diminished slowly and the control cliche after about a month of treatment showed an ulcerous deformation of the bulb without the niche image. No secondary effect.

Conclusion

Good results of the product as gastric dressing with an antiulcerous treatment against a stopped up perforated duodenal ulcer. No side effects were observed. L. A 27 year old male patient was hospitalized for an atypic epigastric pain syndrome having appeared 3 years before and it was accompanied by 2 hyperalgic episodes. 2 series of gastric radiography showed an inflammatory appearance in the bulb without any sign of niche and fibroscopy was normal. Despite the absence of symptomatology, the patient received an antiulcerous treatment comprising 3 sachets of the product of 1 g of active principle, 2 tablets of a speciality based on 100 mg of methylsulfate of diphemanyl, an intramuscular injection of atropine at a dose of 0.25 mg and one injection of a speciality based on a sodium ferroferric complex of 2,3-diketo-1-gulonic acid per day for 29 days. After a few days, epigastralgia began to diminish in intensity but persisted in a minor manner for 8 days and then completely disappeared.

Conclusion

Good results of the product used as a gastric dressing in a complete antiulcerous treatment prescribed for atypic epigastralgia and no side effects were ascertained. M. A 25 year old male patient was hospitalized in an emergency by the staff for a digestive hemorrage (hematemesis and melaena). There was no prior history nor epigastralgic pain nor taking of medicine. Radiography of the stomach made in emergency showed an ulcer evolving in the bulb and after confirmation of the diagnosis, the patient was placed on an antiulcerous treatment comprising 3 sachets per day of the product containing 1 g of active principle per sachet, 3 tablets per day of a speciality based on methylsulfate of diphemanyl and one intramuscular injection of a speciality based on a sodium ferroferric complex of 2,3-diketo-1-gulonic acid. The treatment continued for a month and at the end of the treatment, control radiography showed the persistance of a bulb deformation with a convergence of folds and perhaps a very small centro-bulbair niche without any side effects.

Conclusion

Average effect of the product used as a dressing in an complete antiulcerous treatment for a bulb ulcer with good tolerance. N. A 20 year old male patient hospitalized for epigastric pain accompanied by some non-alimentary vomiting first occuring a few days previously. An identical episode of rythmic post-prandial epigastralgia had unexpectedly occured some months earlier and had lasted 15 days. Radiography of the stomach showed a bulb deformation without a niche image. Endoscopy, gastric tubes and gastric biopsy were normal. It concerned a pseudo-ulcerous symptomatology without radiologic confirmation. The patient was treated at a rate of 3 sachets having 1 g of active principle per day for 10 days. In the first part of the treatment; amelioration then complete disappearance of epigastralgia but it should be noted that the pain began to lessen in sharpness a few days after the start of the treatment. No side effects.

Conclusion

Good results with the product against pseudoulcerous epigastralgia.

The good results of the above study show that the product of the invention possesses a very good activity in the treatment of gastro-duodenal ulcers, of gastritis, of hiatal hernias with reflux, of banal dyspepsy and of digestive accidents due to anti-inflammatory agents.

Various modifications of the compositions and method of the invention may be made without departing from the spirit or scope thereof and it is to be understood that the invention is to be limited only as defined in the appended claims.

I claim:

1. A method of treating pepsic hyperactivity in humans having gastric or duodenal ulcers comprising orally administering to said humans suffering from pepsic hyperactivity an antipepsic effective amount of a mixed sodium-potassium salt of the sulfuric acid ester of a high molecular weight polysaccharide extracted with water from Furcellaria fastigiata algae containing about 5% of sulfur.

* * * * *